UNITED STATES PATENT OFFICE.

WILLIAM H. SAUNDERS, OF CARROLL COUNTY, TENNESSEE, ASSIGNOR OF TWO-THIRDS HIS RIGHT TO M. N. ABERNATHY AND E. P. RANDLE, OF SAME PLACE.

IMPROVEMENT IN ALLOYS FOR PREVENTING FRICTION IN MACHINERY.

Specification forming part of Letters Patent No. 122,408, dated January 2, 1872.

SPECIFICATION.

I, WILLIAM H. SAUNDERS, of the county of Carroll and State of Tennessee, have invented a certain composition of metals called "Saunders' anti-friction metal," to be used in the bearings of machinery to relieve friction, and to avoid heat-wearing and breakage.

The nature of my invention consists in fusing into an alloy the following ingredients: Lead, zinc, antimony, and a certain composition used by molders, (made of resin, tar, glass, and iron filings,) properly tempered and applied to the bearings of machinery.

To prepare "Saunders' anti-friction metal" take of a certain anonymous composition used by foundrymen, (made by fusing together about one part iron filings, one part resin, two parts tar, and one-fourth of a part glass, by weight,) about one part; of zinc about one part; of antimony, two parts; and of lead fourteen parts; fuse and mold into any required design or form.

This alloy, when applied to the bearings of machinery in the form of boxes, bushings, platings, or any other form in which Babbitt or other like metal is commonly used, will greatly tend to relieve friction, consequently to avoid heat and wearing, and on account of its great tenacity will not easily break.

Claim.

I claim as my invention—

The manufacture or preparation of an alloy denominated "Saunders' anti-friction metal," of the ingredients, in or near the proportions, and for the purposes set forth.

WM. H. SAUNDERS.

Attest:
W. H. HAWKINS,
J. T. HALEY. (35)